US012142812B1

(12) United States Patent
Wu et al.

(10) Patent No.: US 12,142,812 B1
(45) Date of Patent: Nov. 12, 2024

(54) THERMAL PROTECTION SYSTEM FOR ANTENNA AND NEAR-FIELD MATCHING DESIGN METHOD THEREOF

(71) Applicant: Beihang University, Beijing (CN)

(72) Inventors: Qi Wu, Beijing (CN); Dongliang Zhang, Beijing (CN); Xuan Liu, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/651,317

(22) Filed: Apr. 30, 2024

(30) Foreign Application Priority Data

May 9, 2023 (CN) ......................... 202310514878.6

(51) Int. Cl.
*H01Q 1/02* (2006.01)
*H01Q 9/04* (2006.01)

(52) U.S. Cl.
CPC ............. *H01Q 1/02* (2013.01); *H01Q 9/0407* (2013.01)

(58) Field of Classification Search
CPC .......... H01Q 1/02; H01Q 1/38; H01Q 9/0407; H01Q 1/22-24; H01Q 1/28
See application file for complete search history.

(56) References Cited

U.S. PATENT DOCUMENTS 5,608,414 A * 3/1997 Amore ..................... H01Q 1/02 343/770
8,378,904 B1 * 2/2013 Colich ..................... H01Q 1/02 343/705
12,009,568 B1 * 6/2024 Quarfoth .................. H01Q 1/02
2022/0166126 A1 * 5/2022 Yousefbeiki ............. H01Q 1/44
2023/0299456 A1 * 9/2023 Kim ......................... H01Q 1/48 343/834

FOREIGN PATENT DOCUMENTS

CN 208142336 U 11/2018
CN 110990965 A 4/2020
CN 113972460 A 1/2022
CN 115901845 A 4/2023

* cited by examiner

*Primary Examiner* — Hasan Islam
(74) *Attorney, Agent, or Firm* — Bayramoglu Law Offices LLC

(57) ABSTRACT

An antenna includes a substrate and a radiator fixed to the substrate. A thermal protection system for the antenna includes a thermal protection sheet body opposite to and spaced from the antenna, where the thermal protection sheet body separates the antenna from an external heat source; and a groove body formed in the thermal protection sheet body, where the radiator generates an antenna near field toward the outside, and an inner wall of the groove body is adapted to an edge of the antenna near field to reduce the deterioration of antenna performance caused by the thermal protection sheet body. The overall electrical performance and the thermal protection performance of the thermal protection system can be well balanced by decreasing the thickness of a middle area of the thermal protection system or by etching a groove in a certain shape in the thermal protection system.

15 Claims, 7 Drawing Sheets

THERMAL PROTECTION SYSTEM FOR ANTENNA AND NEAR-FIELD MATCHING DESIGN METHOD THEREOF

CROSS REFERENCE TO THE RELATED APPLICATIONS

This application is based upon and claims priority to Chinese Patent Application No. 202310514878.6, filed on May 9, 2023, the entire contents of which are incorporated herein by reference.

TECHNICAL FIELD

The present invention relates to the technical field of aerospace, in particular to a thermal protection system for an antenna and a near-field matching design method thereof.

BACKGROUND

Considering aerodynamic factors, antennas on spacecraft are usually installed on or embedded in the surface of the spacecraft. In order to ensure that the antennas can withstand the high temperature environment during the reentry process, the surface of the spacecraft is covered with a thick, lossy thermal protection system. In this case, the thermal protection system should maintain the original performance of the antennas to the maximum extent while ensuring the temperature of the internal devices.

Antenna is an important part of spacecraft. Numerous studies have shown that the arrangement of a thick, lossy thermal protection system near an antenna may have a negative impact on the performance of the antenna, such as changing the resonant frequency, worsening impedance matching, reducing radiation efficiency, and increasing cross-polarization levels.

Existing design methods require extensive simulation and testing, as well as corresponding modifications to the installed antennas to reduce the negative impact of the thermal protection system. In order to make the results more reliable, extremely expensive full-size airframes are required in some tests. Theoretically, this iterative design process is still an engineering method, taking little consideration of the interaction mechanism between the antenna and the thermal protection system.

To this end, a thermal protection system for an antenna and a near-field matching design method thereof are provided to solve the problems stated above.

SUMMARY

The present invention is intended to provide a thermal protection system for an antenna and a near-field matching design method thereof to solve or ameliorate at least one of the technical problems stated above.

In view of this, a first aspect of the present invention is to provide a thermal protection system for an antenna.

A second aspect of the present invention is to provide a near-field matching design method.

The first aspect of the present invention provides a thermal protection system for an antenna. The antenna includes a substrate and a radiator fixed to the substrate. The thermal protection system includes: a thermal protection sheet body opposite to and spaced from the antenna, thermal protection sheet body separating the antenna from an external heat source; and a groove body formed in the thermal protection sheet body, the radiator generating an antenna near field toward the outside, an inner wall of the groove body being adapted to an edge of the antenna near field to reduce the disturbance of the thermal protection sheet body to the antenna near field, wherein parts of the thermal protection sheet body other than the groove body do not intersect with the antenna near field.

Further, the inner wall of the groove body coincides with the edge of the antenna near field.

Further, the thermal protection sheet body is configured as a laminated structure including at least one base layer, wherein the base layer is made of a foam material or a ceramic material, and the dielectric constant of the base layer is within a range of 1.2 to 9.

Further, the groove body has a curved surface center, and the curved surface center is located outside the thermal protection sheet body.

Further, the antenna is configured as a linearly polarized antenna, and the antenna near field is of a cylindrical structure; a cavity of the groove body formed in the thermal protection sheet body is located in the middle of a grooved surface.

Further, the antenna is configured as a circularly polarized antenna, and the antenna near field is of a spherical structure; and a cavity of the groove body formed in the thermal protection sheet body has a curved surface center, and a vertical projection of the curved surface center on a grooved surface coincides with the center of the grooved surface.

The second aspect of the present invention provides a near-field matching design method, including the following steps: S1, based on a positional relationship between an antenna and an external heat source, placing a thermal protection sheet body of a thermal protection system between the antenna and the external heat source, the thermal protection sheet body being spaced from the antenna by a distance; S2, defining a grooved surface of the thermal protection sheet body, and arranging the grooved surface parallel to an end face of the antenna where a radiator is located; S3, obtaining a spatial structure of an antenna near field generated by the radiator of the antenna; and S4, removing an intersection between the thermal protection sheet body and the antenna near field to form a groove body in the grooved surface.

Further, the antenna is configured as a linearly polarized antenna, and the antenna near field is of a cylindrical structure; and a cavity of the groove body formed in the thermal protection sheet body follows the following rule: removing an intersection between the cylindrical structure and the thermal protection sheet body to form the cavity of the groove body.

Further, the antenna is configured as a circularly polarized antenna, and the antenna near field is of a spherical structure; and a cavity of the groove body formed in the thermal protection sheet body follows the following rule: removing an intersection between the spherical structure and the thermal protection sheet body to form the cavity of the groove body.

Compared with the prior art, the present invention has the following beneficial effects:

The overall electrical performance and the thermal protection performance of the system can be well balanced by decreasing the thickness of a middle area of the thermal protection system or by etching a groove in a certain shape in the thermal protection system. Compared with a traditional flat-plate thermal protection system, the invention can provide better thermal protection performance under the same electrical performance and better electrical performance under the same thermal protection performance.

The additional aspects and advantages of embodiments according to the invention will be apparent from the description which follows, or may be learned by practice of embodiments according to the invention.

BRIEF DESCRIPTION OF THE DRAWINGS

The above and/or additional aspects and advantages of the present invention will become apparent and readily understood from the description of the embodiments taken in conjunction with the following drawings, in which.

DETAILED DESCRIPTION OF THE EMBODIMENTS

To make the foregoing objectives, features and advantages of the invention clearer and more understandable, the invention will be further described with reference to the accompanying drawings and specific embodiments. It should be noted that embodiments in the present application and the features in the embodiments may be combined with each other without conflict.

Numerous specific details are set forth in the following description to facilitate a full understanding of the invention. However, the invention may also be practiced otherwise than as described herein. Therefore, the scope of the invention is not limited by the specific embodiments disclosed below.

Referring to FIGS. 1-14, the following describes a thermal protection system for an antenna and a near-field matching design method thereof.

Figure 1:
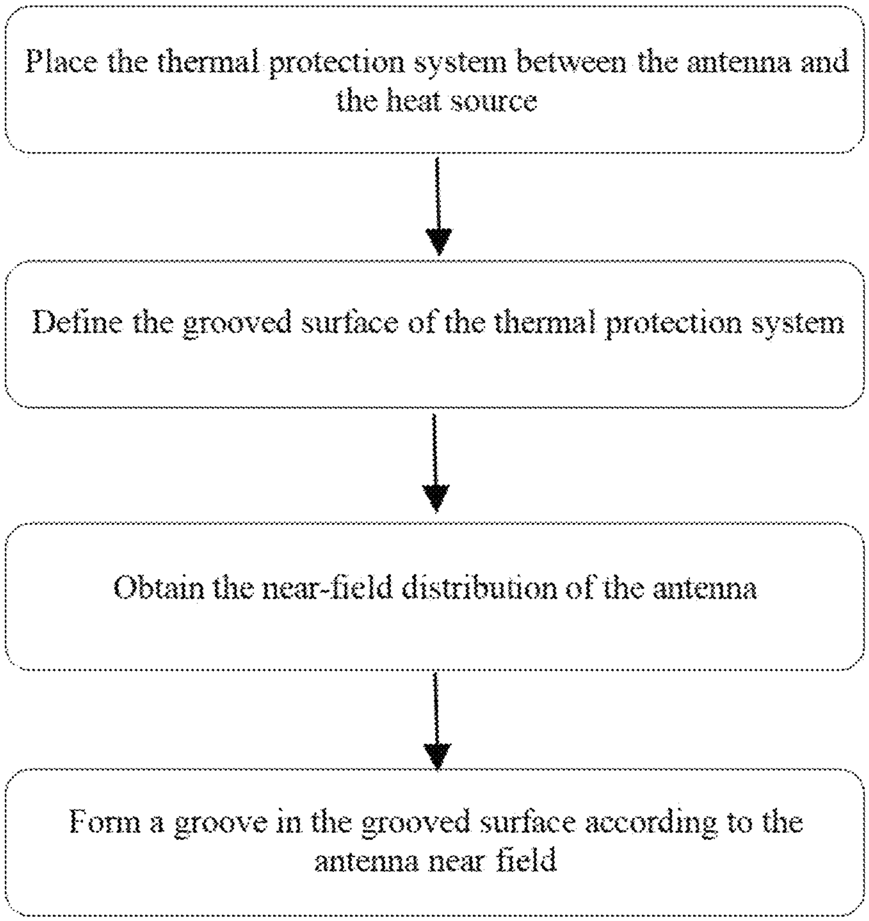
FIG. 1 is a schematic diagram of a near-field matching method of a thermal protection system according to the present invention.
Figure 2:
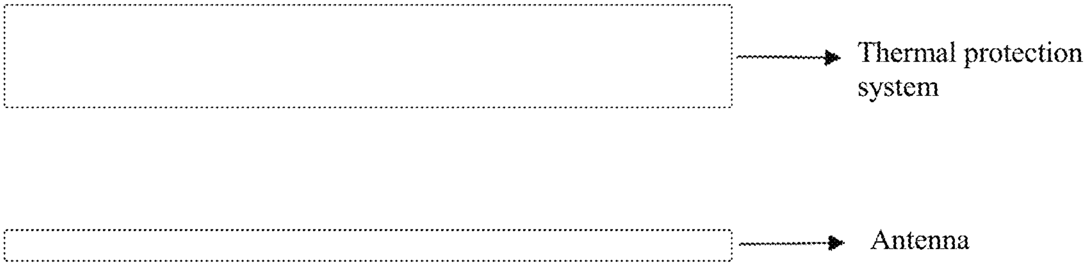
FIG. 2 is a schematic diagram of an arrangement relationship between an antenna and the thermal protection system according to the present invention.

An embodiment of the first aspect of the present invention provides a thermal protection system for an antenna. In some embodiments of the present invention, as shown in FIG. 2, a thermal protection system for an antenna is provided. The thermal protection system for an antenna includes:

the antenna including a substrate and a radiator fixed to the substrate, the thermal protection system including:

- a thermal protection sheet body opposite to and spaced from the antenna, the thermal protection sheet body separating the antenna from an external heat source; and
- a groove body formed in the thermal protection sheet body, the radiator generating an antenna near field toward the outside, an inner wall of the groove body being adapted to an edge of the antenna near field to reduce the disturbance of the thermal protection sheet body to the antenna near field;
- wherein parts of the thermal protection sheet body other than the groove body do not intersect with the antenna near field.

In the thermal protection system for an antenna in the present invention, considering the matching effect of the antenna near field, the impact of the thermal protection system placed near the antenna can be overcome. According to the near field distribution of the antenna, the magnetic field is distributed in the middle area of the antenna. So the impact of the thermal protection system on the electrical performance of the antenna can be reduced by decreasing the thickness of the middle area of the thermal protection system or by forming a groove in the middle area of the thermal protection system.

In any one of embodiments described above, the thermal protection sheet body is configured as a laminated structure including at least one base layer, wherein the base layer is made of a foam material or a ceramic material, and the dielectric constant of the base layer is within a range of 1.2 to 9.

In any one of embodiments described above, the groove body has a center, and the center is located outside the thermal protection sheet body.

In this embodiment, in order to ensure the basic performance of the thermal protection system, a minimum thickness of the thermal protection system needs to be ensured. In the embodiment, this thickness is set to 5 mm, so the center of the groove body must be located outside the thermal protection system.

In any one of embodiments described above, the antenna is configured as a linearly polarized antenna, and the antenna near radiation field is of a cylindrical structure 602; and a cavity of the groove body 604 formed in the thermal protection sheet body 606 is located in the middle of a grooved surface.

In any one of embodiments described above, the antenna is configured as a circularly polarized antenna, and the antenna near radiation field is of a spherical structure 1102;

and a cavity of the groove body 1104 formed in the thermal protection sheet body 1106 has a center, and a projection of the center along the normal line of a grooved surface coincides with the center of the grooved surface.

An embodiment of the second aspect of the present invention provides a near-field matching design method. In some embodiments of the present invention, as shown in FIG. 2, a near-field matching design method is provided. The near-field matching design method includes the following steps:

S1, based on a positional relationship between an antenna and an external heat source, placing a thermal protection sheet body of a thermal protection system between the antenna and the external heat source, the thermal protection sheet body being spaced from the antenna by a distance;

S2, defining a grooved surface of the thermal protection sheet body, and arranging the grooved surface parallel to an end face of the antenna where a radiator is located;

S3, obtaining a spatial structure of an antenna near field generated by the radiator of the antenna; and S4, removing an intersection between the thermal protection sheet body and the antenna near field to form a groove body in the grooved surface.

According to the near-field matching design method of the present invention, the overall electrical performance and the thermal protection performance of the system can be well balanced by decreasing the thickness of a middle area of the thermal protection system or by etching a groove in a certain shape in the thermal protection system. Compared with a traditional flat-plate thermal protection system, the invention can provide better thermal protection performance under the same electrical performance and better electrical performance under the same thermal protection performance.

Further, the distance takes into account the aerodynamic performance of an aircraft, and is less than ½ wavelength;

In any one of embodiments described above, the antenna is configured as a linearly polarized antenna, and the antenna near field is of a cylindrical structure; and a cavity of the groove body formed in the thermal protection sheet body follows the following rule: by using an axial cross-section of the cylindrical structure as the grooved surface and extending in an axis direction of the cylindrical structure, removing an intersection with the thermal protection sheet body to form the cavity of the groove body; wherein the cavity is located axially in the middle of the grooved surface.

In any one of embodiments described above, the antenna is configured as a circularly polarized antenna, and the antenna near field is of a spherical structure; and a cavity of the groove body formed in the thermal protection sheet body follows the following rule: by using a cross-section of the spherical structure including the center of the sphere as the grooved surface and rotating around a normal line of the grooved surface including the center of the sphere, removing an intersection with the thermal protection sheet body to form the cavity of the groove body; wherein the center of the thermal protection sheet body falls on the normal line.

Figure 3:
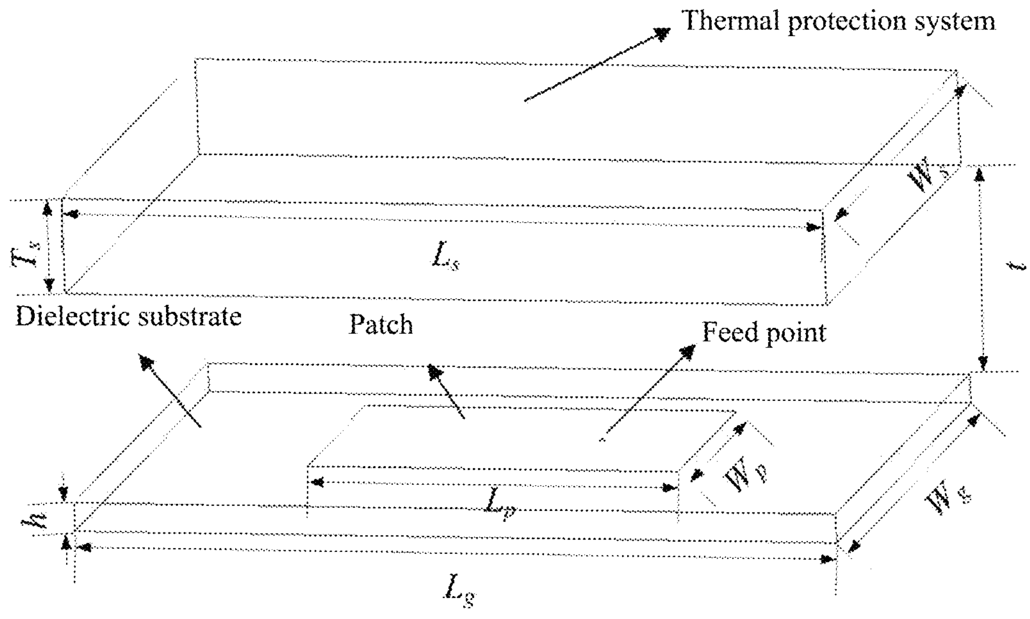
FIG. 3 is a schematic diagram of a linearly polarized reference antenna with the thermal protection system according to Embodiment 1 of the present invention.

Another embodiment of the first aspect of the present invention provides a thermal protection system for an antenna. In some embodiments of the present invention, as shown in FIGS. 3-7, a thermal protection system for an antenna is provided. The thermal protection system for an antenna considers the case where the reference antenna is configured as a linearly polarized antenna:

The reference antenna is a linearly polarized microstrip antenna, as shown in FIG. 3. In this embodiment, the dimensions of relevant parameters of the linearly polarized microstrip antenna are exemplarily set as follows:

$L_g$=80 mm, $W_g$=60 mm, $L_p$=39 mm, $W_p$=26 mm, $L_s$=80 mm, $W_s$=60 mm, $T_s$=10 mm, t=12 mm.

Figure 4:
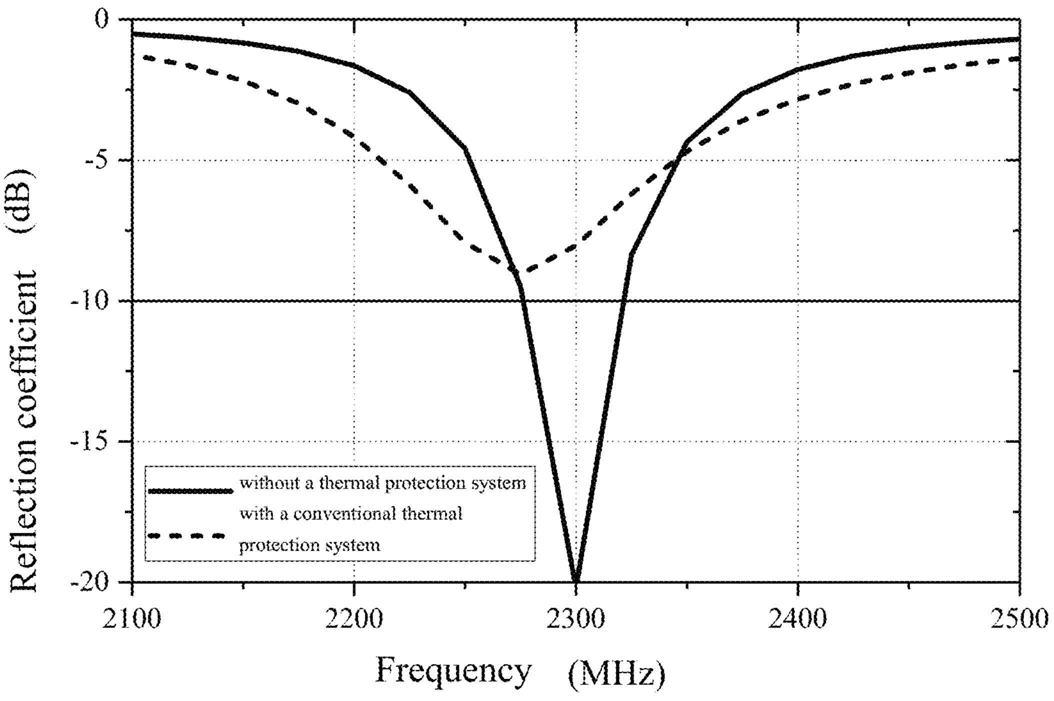
FIG. 4 shows the impact of the thermal protection system on the impedance matching of the linearly polarized antenna according to Embodiment 1 of the present invention.
Figure 5:
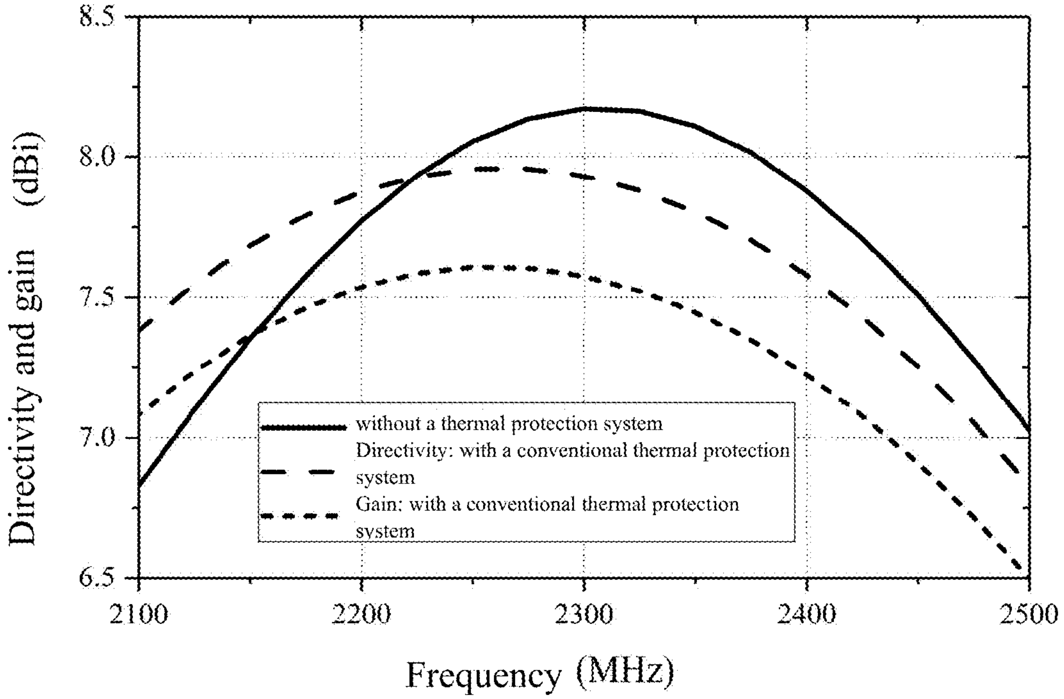
FIG. 5 shows the impact of the thermal protection system on the far-field performance of the linearly polarized antenna according to Embodiment 1 of the present invention.

The use of a thermal protection system will affect the reflection coefficient, directivity and gain of the reference antenna. The thermal protection system has a dielectric constant of 4.5 and a loss tangent of 0.05. The results show that the use of the thermal protection system significantly reduces the impedance matching performance of the linearly polarized patch antenna, the resonant frequency is decreased by 30 MHz, and the reflection coefficient amplitude deteriorates from −20 dB to 3 dB, as shown in FIG. 4. In addition, due to the loss of the thermal protection system, the gain of the antenna is about 0.45 dB less than its directivity, and the radiation efficiency of the antenna is reduced to 90% of the original radiation efficiency, as shown in FIG. 5.

Figure 6:
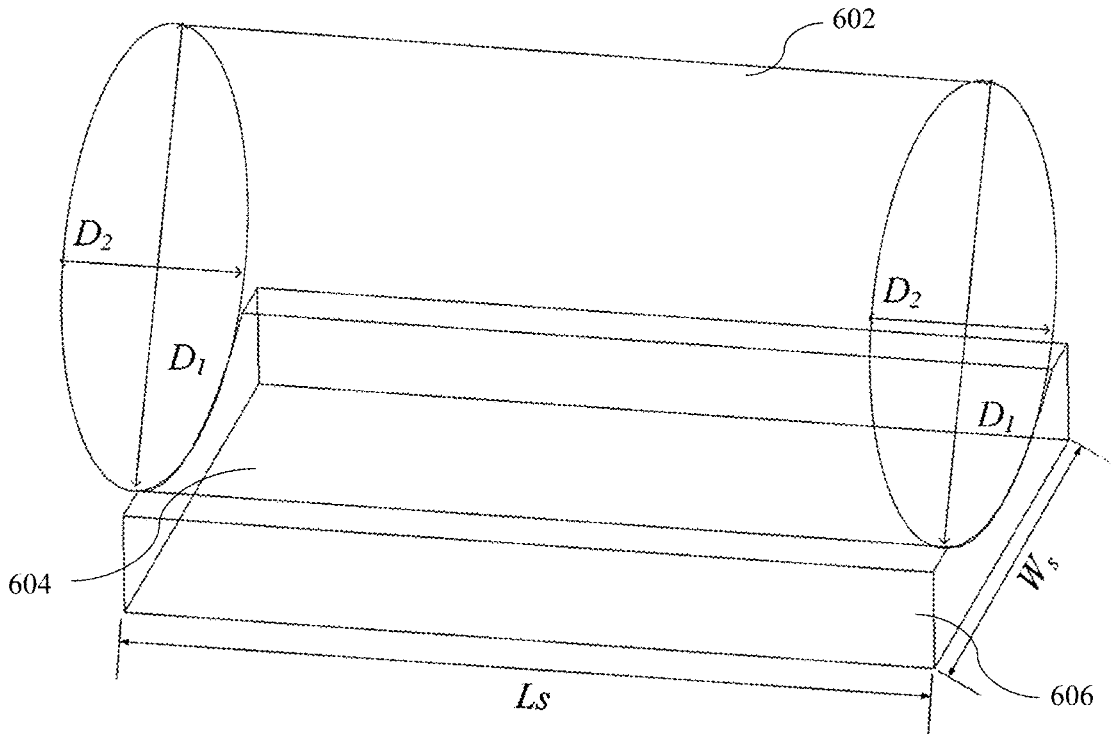
FIG. 6 is a schematic diagram of an improved thermal protection system according to Embodiment 1 of the present invention.

The shape of the linearly polarized thermal protection system may be improved by subtracting a cylinder, as shown in FIG. 6, $D_1$=120 mm, $D_2$=120 mm. The cylinder is oriented parallel to the polarization direction of the linearly polarized patch antenna to fit the beam shape of the radiation pattern. The improved thermal protection system obtains a near-field magnetic field distribution similar to that of the athermal protection system, which can significantly reduce electromagnetic wave scattering. This technology is beneficial to the optimization of thermal protection systems and is called near-field matching technology.

Figure 7:
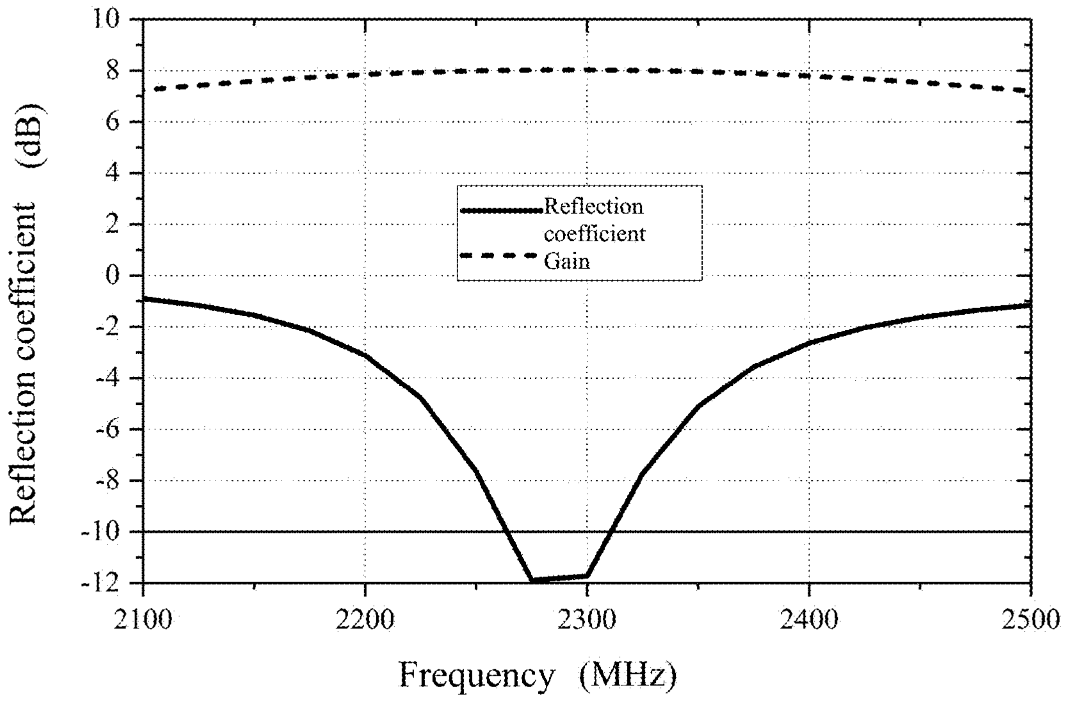
FIG. 7 shows the performance of an antenna using the improved thermal protection system according to Embodiment 1 of the present invention.

The results obtained in a case where the improved thermal protection system is used are shown in FIG. 7. It can be seen that the reflection coefficient of the linearly polarized patch antenna using the improved thermal protection system has been greatly improved compared with the results shown in FIG. 4, that is, the deviation in resonant frequency is alleviated, and the resonance depth is below-10 dB. In addition, the gain of the antenna using the improved design is also increased by about 0.5 dBi. On the basis of these two indicators, the overall performance of the linearly polarized patch antenna with the improved thermal protection system is comparable to that of a microstrip patch antenna without a thermal protection system. In other words, the modification of the structure of the thermal protection system based on the near-field matching method is an effective way to overcome the negative impact of the thermal protection system.

Figure 8:
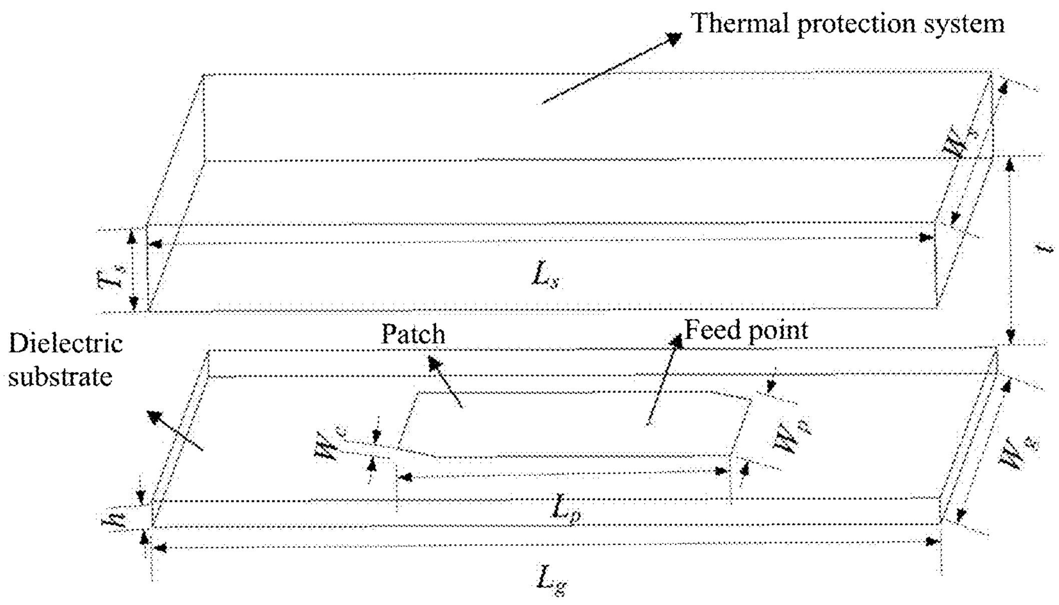
FIG. 8 is a schematic diagram of a circularly polarized reference antenna with the thermal protection system according to Embodiment 2 of the present invention.

Another embodiment of the first aspect of the present invention provides a thermal protection system for an antenna. In some embodiments of the present invention, as shown in FIGS. 8-14, a thermal protection system for an antenna is provided. The thermal protection system for an antenna considers the case where the reference antenna is configured as a circularly polarized antenna:

The reference antenna is a circularly polarized microstrip antenna, as shown in FIG. 8. This circularly polarized antenna is a basic form of a microstrip circularly polarized antenna composed of truncated corner and feed offset.

In this embodiment, the dimensions of relevant parameters of the circularly polarized microstrip antenna are exemplarily set as follows:

$L_g$=90 mm, $W_g$=90 mm, $L_p$=38.4 mm, $W_p$=38.4 mm, $L_s$=90 mm, $W_s$=90 mm, $T_s$=10 mm, t=12 mm, Wc=90 mm, h=3 mm.

Figure 9:
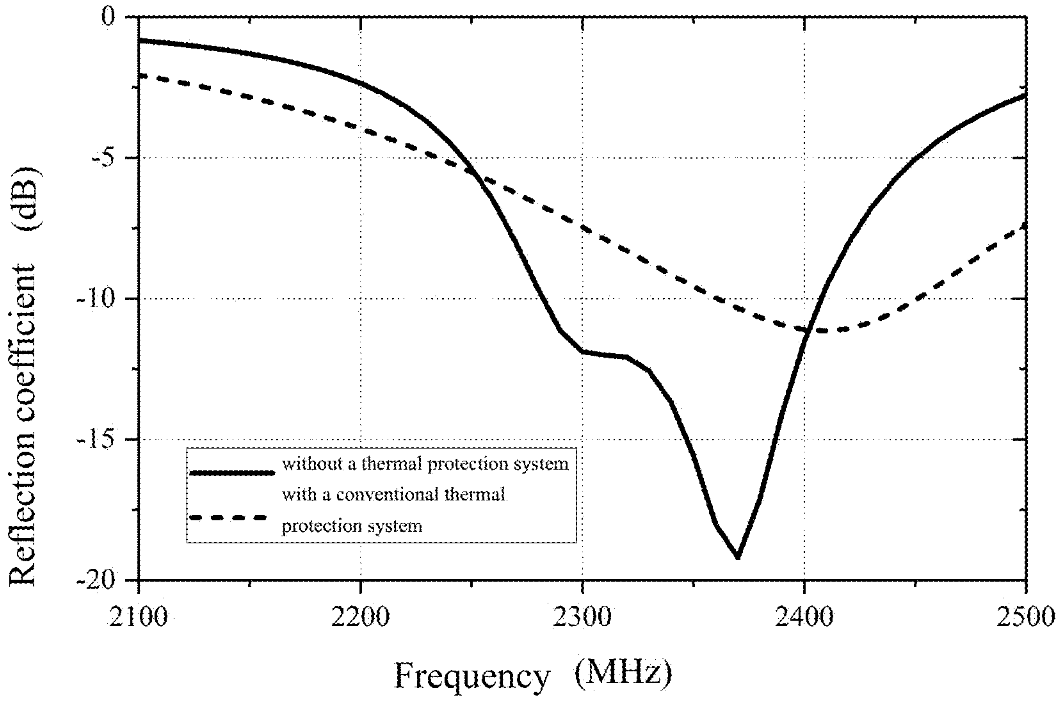
FIG. 9 shows reflection coefficients of the antenna according to Embodiment 2 of the present invention before and after the addition of a conventional flat-plate thermal protection system.
Figure 10:
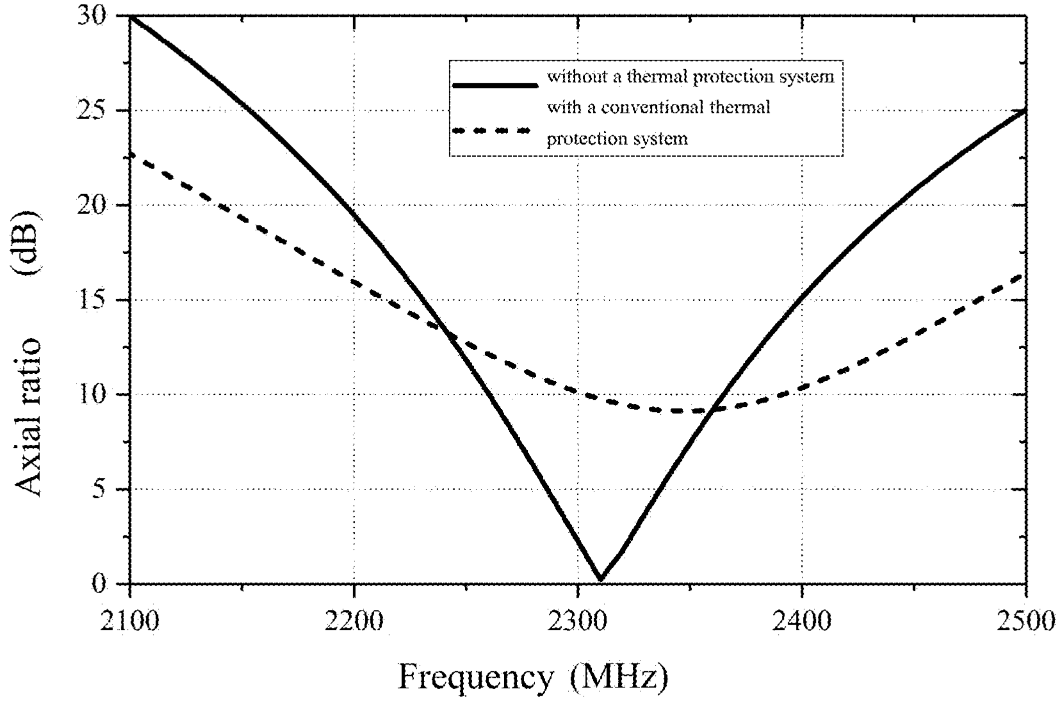
FIG. 10 shows axial ratios of the antenna according to Embodiment 2 of the present invention before and after the addition of a conventional flat-plate thermal protection system.

As shown in FIGS. 9 and 10, a single circularly polarized patch antenna performs well in terms of impedance matching and axial ratio. A conventional flat-plate thermal protection system with a dielectric constant of 4.5 and a loss tangent of 0.05 is added above the circularly polarized patch antenna. Its impact can be observed in FIGS. 9 and 10. The introduction of the thermal protection system worsens the reflection coefficient and axial ratio. The circularly polarized patch antenna of the conventional flat-plate thermal protection system has a poor axial ratio, which needs to be overcome in practical applications.

Figure 11:
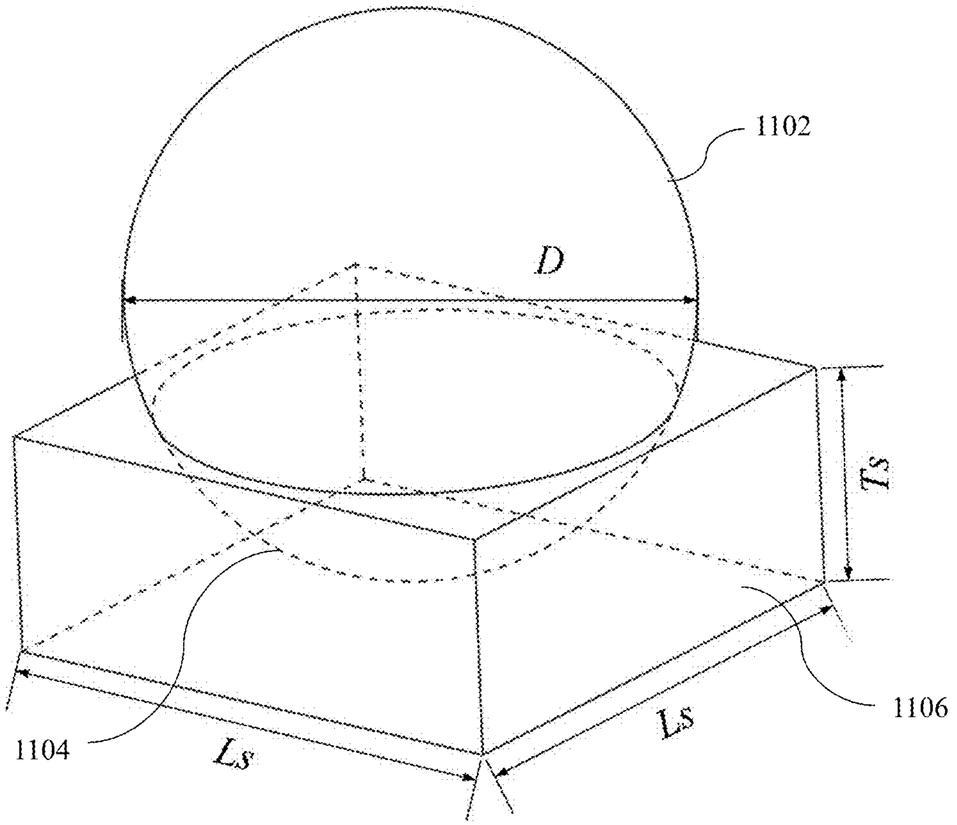
FIG. 11 is a schematic diagram of an improved thermal protection system according to Embodiment 2 of the present invention.
Figure 12:
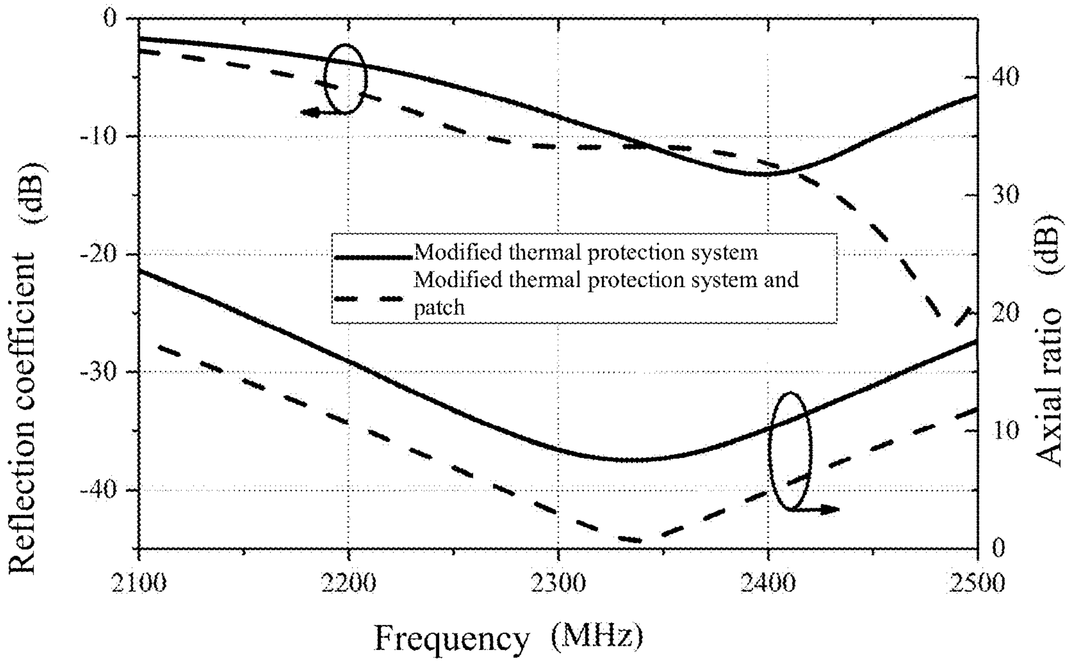
FIG. 12 shows the performance of the improved thermal protection system and a patch antenna according to Embodiment 2 of the present invention.

In order to alleviate the impact of the thermal protection system, a different thermal protection system shape is provided to match the near-field distribution, as shown in FIG. 11. The thermal protection system is modified by subtracting a large sphere from the original flat-plate thermal protection system, D=180 mm. The resulting structure is rotationally symmetrical and suitable for circularly polarized patch antennas. In the meanwhile, the thermal protection system can still effectively provide thermal insulation protection. The improvement of the thermal protection system significantly improves the performance of the antenna. As shown in FIG. 12, the impedance matching performance of the circularly polarized patch antenna is improved, and the axial ratio is also reduced by about 2 dB.

Figure 13:
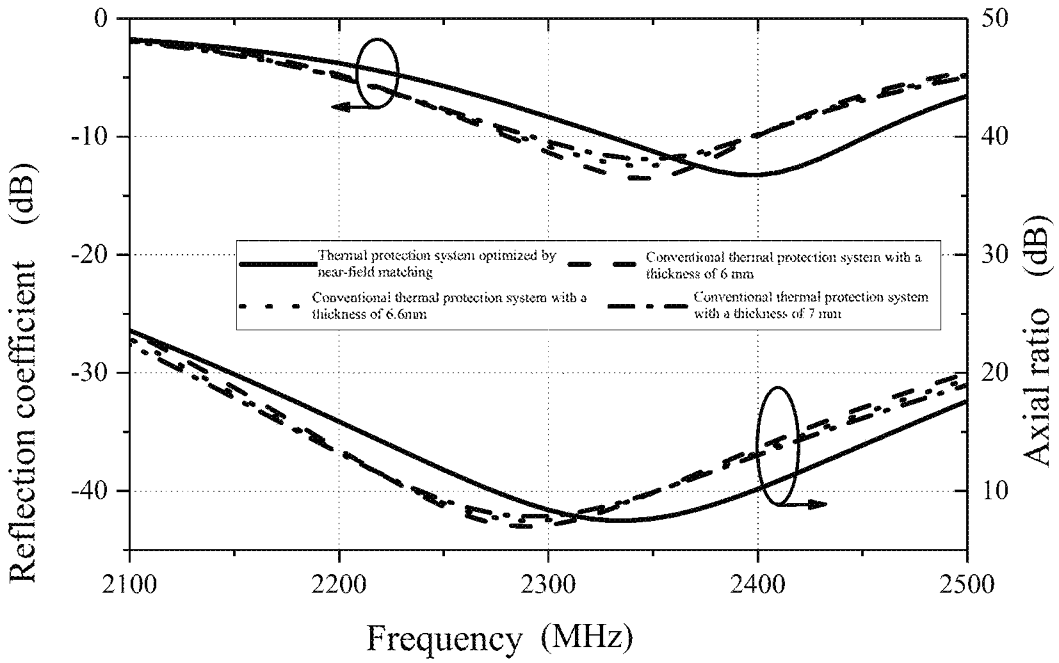
FIG. 13 shows comparison in electrical performance of the thermal protection system before and after the improvement according to Embodiment 2 of the present invention.
Figure 14:
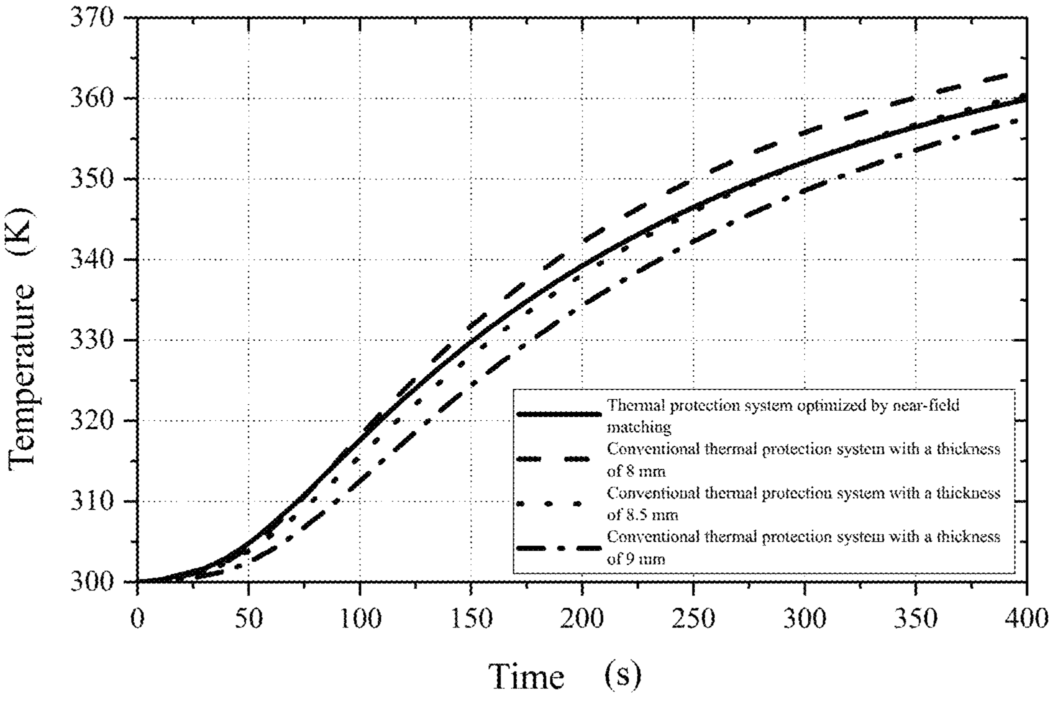
FIG. 14 shows comparison in thermal protection performance of the thermal protection system before and after the improvement according to Embodiment 2 of the present invention.

By comparison with the electrical performance and thermal protection performance of a conventional thermal protection system, the superiority of this design is verified. This thermal protection system has electrical performance similar to that of the conventional thermal protection system with a thickness of 6.6 mm, as shown in FIG. 13, but can provide thermal protection similar to that of a thermal protection system with a thickness of 8 mm, as shown in FIG. 14.

In the description of the present invention, it should be understood that directional or positional relationships, indicated by the terms "longitudinal", "lateral", "upper", "lower", "front", "rear", "left", "right", "vertical", "horizontal", "top", "bottom", "inside", "outside" and the like, are based on the directional or positional relationships shown in the drawings. They are only for the convenience of describing the present invention, rather than indicating or implying that the described device or element must have a particular direction or must be constructed and operated in a particular direction, and therefore they cannot to be construed as limiting the present invention.

The embodiments described above are only preferred embodiments of the present invention, and are not intended to limit the scope of the present invention. Without departing from the design spirit of the present invention, those of ordinary skill in the art can make various modifications to the technical solutions of the present invention. All deformations and improvements shall fall within the scope defined by the claims of the present invention.

What is claimed is:

1. A thermal protection system for an antenna, wherein the antenna comprises a substrate and a radiator fixed to the substrate, and the thermal protection system comprises:

a thermal protection sheet body opposite to and spaced from the antenna, wherein the thermal protection sheet body separates the antenna from an external heat source; and a groove body formed in the thermal protection sheet body, wherein the radiator generates a near radiation field of the antenna, a wall of the groove body is adapted to an edge of the near radiation field to reduce disturbance of the thermal protection sheet body to the near radiation field;

wherein parts of the thermal protection sheet body other than the groove body do not intersect with the near radiation field.

2. The thermal protection system for the antenna according to claim 1, wherein the wall of the groove body coincides with the edge of the near radiation field.

3. The thermal protection system for the antenna according to claim 1, wherein the thermal protection sheet body is configured as a laminated structure including at least one base layer;

wherein the at least one base layer is made of a foam material or a ceramic material, and a dielectric constant of the at least one base layer is within a range of 1.2 to 9.

4. The thermal protection system for the antenna according to claim 1, wherein the groove body has a curved surface center, and the curved surface center is located outside the thermal protection sheet body.

5. The thermal protection system for the antenna according to claim 1, wherein the antenna is configured as a linearly polarized antenna, and the near radiation field is of a cylindrical structure; and a cavity of the groove body formed in the thermal protection sheet body is located in a middle of a grooved surface.

6. The thermal protection system for the antenna according to claim 1, wherein the antenna is configured as a circularly polarized antenna, and the near radiation field is of a spherical structure; and a cavity of the groove body formed in the thermal protection sheet body has a curved surface center, and a vertical projection of the curved surface center on a grooved surface coincides with a center of the grooved surface.

7. A near-field matching design method for designing the thermal protection system for the antenna according to claim 1, comprising the following steps:

S1, based on a positional relationship between the antenna and the external heat source, placing the thermal protection sheet body of the thermal protection system between the antenna and the external heat source, the thermal protection sheet body being spaced from the antenna by a distance;

S2, defining a grooved surface of the thermal protection sheet body, and arranging the grooved surface parallel to an end face of the antenna where the radiator is located;

S3, obtaining a spatial structure of the near radiation field generated by the radiator of the antenna; and S4, removing an intersection between the thermal protection sheet body and the near radiation field to form the groove body in the grooved surface.

8. The near-field matching design method according to claim 7, wherein the antenna is configured as a linearly polarized antenna, and the near radiation field is of a cylindrical structure;

a cavity of the groove body formed in the thermal protection sheet body follows the following rule:

removing an intersection between the cylindrical structure and the thermal protection sheet body to form the cavity of the groove body.

9. The near-field matching design method according to claim 7, wherein the antenna is configured as a circularly polarized antenna, and the near radiation field is of a spherical structure; and a cavity of the groove body formed in the thermal protection sheet body follows the following rule:

removing an intersection between the spherical structure and the thermal protection sheet body to form the cavity of the groove body.

10. The near-field matching design method according to claim 7, wherein in thermal protection system for the antenna, the wall of the groove body coincides with the edge of the near radiation field.

11. The near-field matching design method according to claim 7, wherein in thermal protection system for the antenna, the thermal protection sheet body is configured as a laminated structure including at least one base layer;

wherein the at least one base layer is made of a foam material or a ceramic material, and a dielectric constant of the at least one base layer is within a range of 1.2 to 9.

12. The near-field matching design method according to claim 7, wherein in thermal protection system for the antenna, the groove body has a curved surface center, and the curved surface center is located outside the thermal protection sheet body.

13. The near-field matching design method according to claim 7, wherein in thermal protection system for the antenna, the antenna is configured as a linearly polarized antenna, and the near radiation field is of a cylindrical structure; and a cavity of the groove body formed in the thermal protection sheet body is located in a middle of the grooved surface.

14. The near-field matching design method according to claim 7, wherein in thermal protection system for the antenna, the antenna is configured as a circularly polarized antenna, and the near radiation field is of a spherical structure; and a cavity of the groove body formed in the thermal protection sheet body has a curved surface center, and a vertical projection of the curved surface center on the grooved surface coincides with a center of the grooved surface.

15. The thermal protection system for the antenna according to claim 1, wherein the radiator is a patch radiator.

* * * * *